United States Patent
Wakabayashi et al.

(10) Patent No.: US 9,467,679 B2
(45) Date of Patent: Oct. 11, 2016

(54) VEHICLE PERIPHERY MONITORING DEVICE

(75) Inventors: Haruki Wakabayashi, Anjo (JP); Kosuke Sato, Tokai (JP); Kinji Yamamoto, Anjo (JP); Shoko Takeda, Yokkaichi (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 314 days.

(21) Appl. No.: 14/234,914

(22) PCT Filed: Aug. 21, 2012

(86) PCT No.: PCT/JP2012/071084
§ 371 (c)(1),
(2), (4) Date: Jan. 24, 2014

(87) PCT Pub. No.: WO2013/047012
PCT Pub. Date: Apr. 4, 2013

(65) Prior Publication Data
US 2014/0152774 A1    Jun. 5, 2014

(30) Foreign Application Priority Data

Sep. 27, 2011 (JP) ................................. 2011-211289

(51) Int. Cl.
| H04N 7/18 | (2006.01) |
| G06T 3/00 | (2006.01) |
| H04N 13/02 | (2006.01) |
| G08G 1/16 | (2006.01) |

(52) U.S. Cl.
CPC ............. *H04N 13/0207* (2013.01); *G06T 3/00* (2013.01); *G06T 3/005* (2013.01); *G08G 1/168* (2013.01); *H04N 7/18* (2013.01)

(58) Field of Classification Search
None
See application file for complete search history.

(56) References Cited

U.S. PATENT DOCUMENTS

| 7,432,799 B2 | 10/2008 | Tsuboi |
| 2002/0080017 A1 | 6/2002 | Kumata et al. |
| 2004/0260469 A1 | 12/2004 | Mizusawa |

(Continued)

FOREIGN PATENT DOCUMENTS

| CN | 1621780 | * 12/2004 | ............ G01C 21/30 |
| EP | 1197937 A1 | 4/2002 | |

(Continued)

OTHER PUBLICATIONS

International Search Report of PCT/JP2011/052136, dated Apr. 19, 2011.

(Continued)

*Primary Examiner* — Reza Aghevli
(74) *Attorney, Agent, or Firm* — Sughrue Mion, PLLC

(57) ABSTRACT

A vehicle periphery monitoring device includes a first bird's-eye view image generation section generating a first bird's-eye view image through a two-dimensional plane projective transformation based on a photographed image acquired by an in-vehicle camera module, a second bird's-eye view image generation section generating a second bird's-eye view image through a three-dimensional plane projective transformation based on the photographed image, and a displaying image generation section generating a first displaying image for monitor displaying from the first bird's-eye view image and a second displaying image for monitor displaying having a higher displaying magnification than the first displaying image, from a predetermined area of the second bird's-eye view image corresponding to a predetermined area of the first bird's-eye view image.

18 Claims, 7 Drawing Sheets

(56) References Cited

U.S. PATENT DOCUMENTS

| | | | |
|---|---|---|---|
| 2006/0119472 A1* | 6/2006 | Tsuboi | B60Q 9/005 340/435 |
| 2006/0192660 A1* | 8/2006 | Watanabe | B60R 1/00 340/435 |
| 2009/0073263 A1* | 3/2009 | Harada | B60R 1/00 348/148 |
| 2009/0097708 A1* | 4/2009 | Mizuta | G06T 11/00 382/103 |
| 2010/0045448 A1* | 2/2010 | Kakinami | B60R 1/00 340/435 |
| 2011/0063444 A1* | 3/2011 | Okamoto | B60R 1/00 348/148 |
| 2011/0074957 A1* | 3/2011 | Kiyohara | G06K 9/342 348/148 |
| 2011/0169955 A1 | 7/2011 | Watanabe et al. | |

FOREIGN PATENT DOCUMENTS

| | | |
|---|---|---|
| EP | 2 150 054 A1 | 2/2010 |
| JP | 2002-19556 A | 1/2002 |
| JP | 2002-218451 A | 8/2002 |
| JP | 2005-167638 A | 6/2005 |
| JP | 2006-131166 A | 5/2006 |
| JP | 2006-252389 A | 9/2006 |
| JP | 2006-273190 A | 10/2006 |
| JP | 2007-235529 A | 9/2007 |
| JP | 2008-254710 A | 10/2008 |
| JP | 2008-301091 A | 12/2008 |
| JP | 2009-111946 A | 5/2009 |
| JP | 2009-239674 A | 10/2009 |
| JP | 2010-130413 A | 6/2010 |

OTHER PUBLICATIONS

International Preliminary Report of Patentability for PCT/JP2011/052136, dated Nov. 1, 2012.
Communication dated Apr. 17, 2015 from the European Patent Office in counterpart European Application No. 12835292.9.
International Preliminary Report of Patentability issued Mar. 27, 2014 in International Application No. PCT/JP2012/071084.
International Search Report of PCT/JP2012/071084, dated Nov. 13, 2012.

* cited by examiner

Fig.2
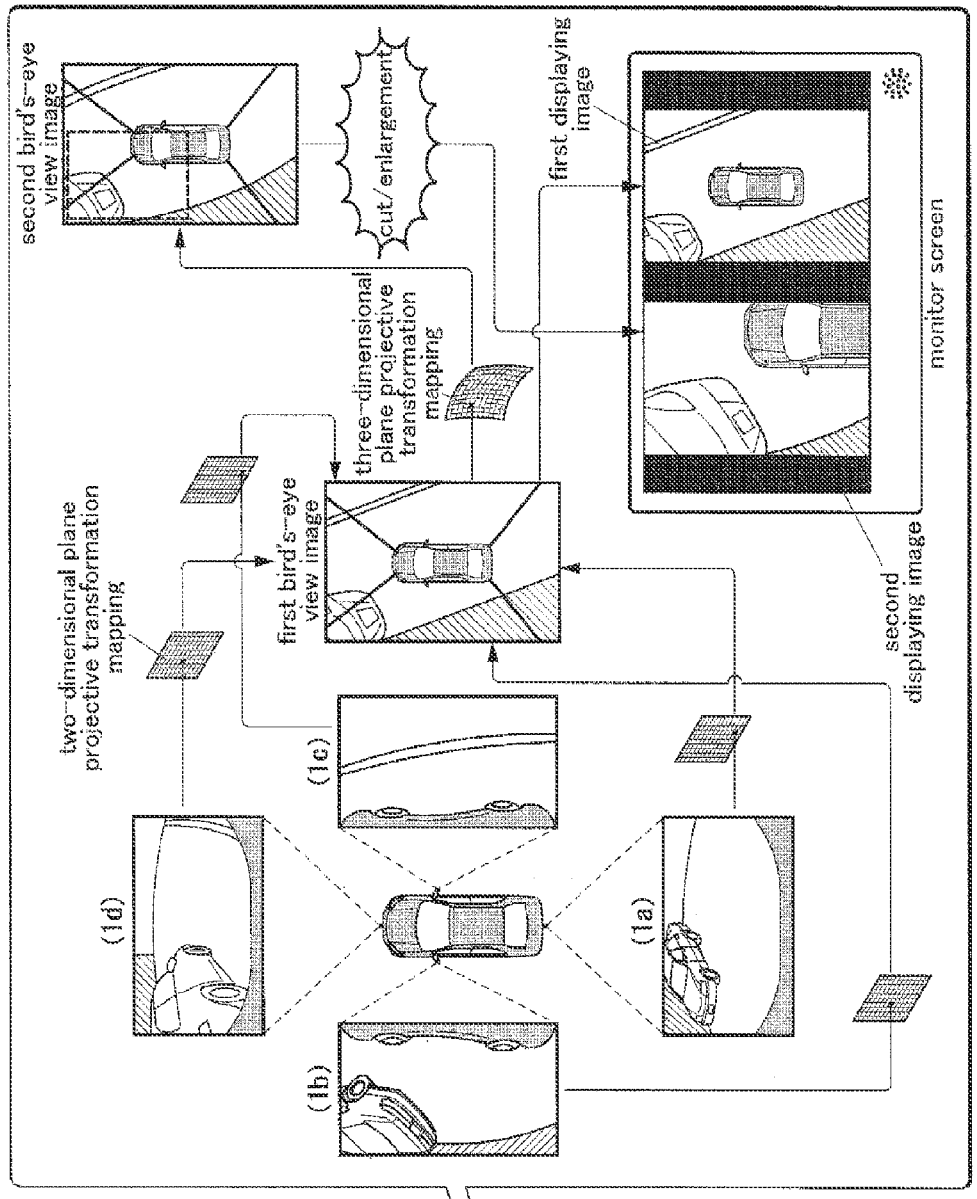
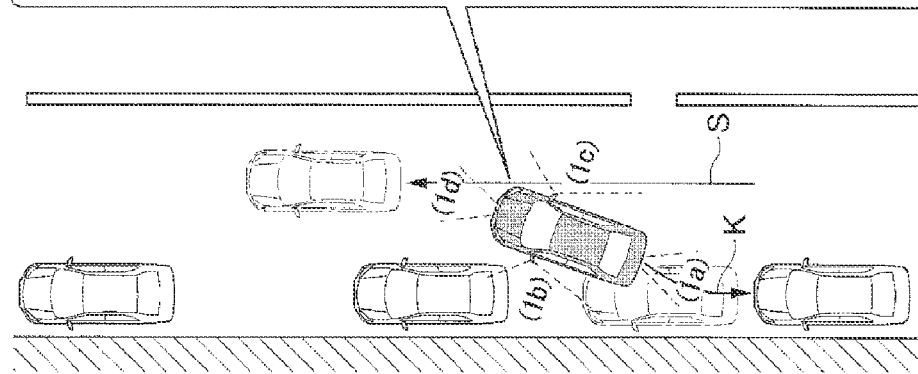

VEHICLE PERIPHERY MONITORING DEVICE

CROSS REFERENCE TO RELATED APPLICATIONS

This application is a National Stage of International Application No. PCT/JP2012/071084 filed Aug. 21, 2012, claiming priority based on Japanese Patent Application No. 2011-211289, filed Sep. 27, 2011, the contents of all of which are incorporated herein by reference in their entirety.

TECHNICAL FIELD

The present invention relates to a vehicle periphery monitoring device configured to generate, as a displaying image, a bird's-eye view image from an upper virtual viewpoint upwardly of a camera viewpoint through a projective transformation of a photographed image acquired by an in-vehicle camera for photographing a peripheral area of a self vehicle and to display it on a monitor.

BACKGROUND ART

Conventionally, there is known a technique for assisting a driver by monitor-displaying a bird's-eye view image viewed downwards from an upper virtual viewpoint of a vehicle in order to check a blind spot of a self vehicle. This bird's-eye view image is obtained by photographing a vehicle periphery with multiple in-vehicle cameras and effecting viewpoint conversion on these photographed images acquired by the multiple in-vehicle cameras for rendering them into images viewed downwards from an upper virtual viewpoint upwardly of the vehicle and joining these images together. In the course of the above, an ingenious arrangement is provided for allowing the driver to readily recognize the situation of the self vehicle periphery by synthesizing a self vehicle image representing the self vehicle at the center of the bird's-eye view image which is being displayed on the monitor.

A vehicle periphery displaying device using such bird's-eye view image is described in Patent Document 1. With this vehicle periphery displaying device, a bird's-eye view image of vehicle periphery is displayed based on respective photographed images photographed by multiple cameras. And, this bird's-eye view image is divided into a plurality of areas and a target image corresponding to an area selected by a user is displayed with enlargement. Therefore, since a particular area in the bird's-eye view image selected by the user is displayed with enlargement, there accrues an advantage that only an area of interest in the periphery is displayed with enlargement. However, in the bird's-eye view image from an upper virtual viewpoint obtained through the projective transformation from the photographed images, an object having a certain height from a road surface will appear with significant distortion, which makes it difficult for the driver to recognize the distance and/or the size thereof.

Further, according to a parking assistance device described in Patent Document 2, the device includes an image acquiring means for acquiring an image of periphery of a self vehicle, an image transforming means for generating a bird's-eye view image from an upper virtual viewpoint of the self vehicle from images of periphery of the self vehicle and an image of the self vehicle, and a 3D object detecting means for detecting a 3D object present in the periphery of the self vehicle and calculating a distance of the object from the self vehicle and a relative speed as 3D object information. Further, in case it is found based on the 3D object information that the 3D object is a moving object, the bird's-eye view image is displayed on the monitor with such change of scale reduction that allows this 3D object to be displayed at an end of the bird's-eye view image. More particularly, in displaying of the bird's-eye view image, the bird's-eye view image is displayed in enlargement with change of the scale reduction that causes the 3D object to be displayed at the end of the bird's-eye view image relative to the self vehicle as the center, when the self vehicle and the 3D object in the periphery approach each other. However, even with this device, the device only enlarges a portion of the bird's-eye view image. Therefore, in this enlarged image, the object having a certain height from the road surface will appear with significant distortion, which makes it difficult for the driver to recognize the distance and/or the size thereof.

Also known is an image synthesis device attempting to reduce image distortion by generating a projection image obtained by further effecting a projective transformation using a three-dimensional projection plane consisting of a spherical face and a cylindrical face on the projection image using a two-dimensional projection plane constituting the road surface plane, when photographed images obtained by multiple cameras having differing viewpoints are to be synthesized with each other. However, with this device, the displaying image which is finally displayed is a projection image using the three-dimensional projection plane, there is a problem that it is not possible to secure sufficiently straightness of a recognition symbol on road surface such as a white line which was possible with the bird's-eye view image from the upper virtual viewpoint.

PRIOR ART DOCUMENTS

Patent Documents

Patent Document 1: Japanese Unexamined Patent Application Publication No. 2009-239674 (paragraphs [0008-0013], FIG. 14)
Patent Document 2: Japanese Unexamined Patent Application Publication No. 2009-111946 (paragraphs [0011-0057], FIG. 4)

SUMMARY OF THE INVENTION

Object to be Achieved by Invention

In view of the above-described state of the art, there is a need for a vehicle periphery monitoring device capable of generating a bird's-eye view images suitable for respective displaying purpose when not only a normal bird's-eye view image, but also its partially enlarged bird's-eye view image too is displayed on a monitor.

Means to Achieve the Object

A vehicle periphery monitoring device according to the present invention comprises an in-vehicle camera module photographing a peripheral area of a vehicle; a first bird's-eye view image generation section generating a first bird's-eye view image through a two-dimensional plane projective transformation based on a photographed image acquired by the in-vehicle camera module; a second bird's-eye view image generation section generating a second bird's-eye view image through a three-dimensional plane projective transformation based on the photographed image; and a displaying image generation section generating a first displaying image for monitor displaying from the first bird's-eye view image and a second displaying image for monitor displaying having a higher displaying magnification than the first displaying image, from a predetermined area of the second bird's-eye view image corresponding to a predetermined area of the first displaying image; wherein based on 3D object detection information received from a 3D object detection section detecting a 3D object in the vehicle periphery, the second displaying image including an area where the 3D object is present is displayed on the monitor.

With the above arrangement, the first displaying image is based on the well-known normal bird's-eye view image (first bird's-eye view image) using a two-dimensional plane (normally a road surface) as the projection plane. Therefore, its linearity of e.g. a white line painted on-road surface is good. So, through this first displaying image, the driver can readily grasp the general situation of the periphery. The second displaying image is based on the second bird's-eye view image which suffers less image deformation, than the first bird's-eye view image, of a 3D object (e.g. a parked vehicle, a road cone, etc.) extending vertically upwards from the road surface through use of a three-dimensional plane as the projection plane. Further, as this second displaying image is displayed in enlargement with being limited to an area corresponding to a predetermined area of the first displaying image, there is obtained good visibility for the driver for an area of interest nearby the self vehicle, e.g. a 3D object present nearby the self vehicle. Further, when there is no particular area of interest, there is no need for displaying both the first displaying image and the second displaying image on the monitor having only a limited displaying space. In particular, the second displaying image, which is also an enlarged image of a particular area in the first displaying image, becomes important when an on-road 3D object is present in the periphery of the self vehicle. Therefore, according to the above arrangement, the second displaying image including an area where the 3D object is present can be displayed on the monitor.

Incidentally, in the above, the language: a three-dimensional plane as a projection plane is understood to mean not being a single plane such as a road surface, including not only a curved face, but also a plane consisting of multiple different planes, e.g. a bent plane or a staircase-like plane. Yet, in consideration of the visibility or linearity, etc., a concave plane including a semi-spherical plane or a dome-shaped plane, etc. will be suitable. Accordingly, in a preferred embodiment of the present invention, the three-dimensional plane projective transformation employs a concave plane as a projective plane.

According to one preferred embodiment of the present invention, the first displaying image and the second displaying image are displayed on a same monitor screen. With this, through visual comparison between the first displaying image that allows map-like grasping of the periphery situation and the second displaying image that allows easy grasping of the distance between the on-road 3D object and the self vehicle, the driver can monitor the vehicle periphery more accurately and more easily.

In the above, in the case of no 3D object detection section is provided or in order to satisfy a desire to view the second displaying image of an area where no 3D object is detected by the 3D object detection section, it is possible to employ an arrangement in which the second displaying image including a vehicle periphery area designated by a vehicle passenger is displayed on the monitor.

Further, the second displaying image which is an enlarged bird's-eye view image of a vehicle periphery area is suitable for grasping of positional relationship between a traveling obstacle such as other vehicle and the self vehicle during traveling for parking. In particular, in the case of a parking assistance device which sets an available parking area in advance and calculates a parking drive pathway to this parking area thereby to assist a parking drive along the parking drive pathway, it is not rare that a 3D object approaching the self vehicle about to be parked has been detected at the time of setting of the parking area or calculation of the parking drive pathway. When such condition as above is satisfied, it will be advantageous if the second displaying image is displayed when a portion of the self vehicle approaches the 3D object during traveling for parking. Therefore, according to one preferred embodiment of the present invention, based on parking assistance information including information relating to parking drive pathway, a parking area and a parked vehicle acquired from a parking assistance module effecting a parking control for setting the parking area and generating the parking drive pathway for guiding the vehicle to the parking area, a timing for displaying the second displaying image is determined and at this timing, the second displaying image is displayed on the monitor.

According to the present invention, an in-vehicle camera module comprises a single camera and the first and second bird's-eye view images are generated from a photographed image of this camera. It will be effective for a driving assistance if only a photographed image of a rear view camera for photographing a rear periphery area that tends to be the biggest blind spot for the driver is utilized. However, it will be best for the vehicle periphery monitoring if the in-vehicle camera module comprises multiple in-vehicle cameras having an overlapping area where respective photographing areas thereof are overlapped with each other and bird's-eye view images of the photographed images of the respective cameras are panorama-synthesized to generate a whole-periphery image. In this, when the bird's-eye view images of adjacent photographed images are synthesized with superposing the overlapped areas thereof, there occurs deformation in an object present at the overlapped areas. Therefore, advantageously, a blending synthesis is effected at the overlapped areas. For this reason, according to a preferred embodiment of the present invention utilizing photographed images of multiple cameras, the first bird's-eye view image and the second bird's-eye view image are generated by panorama synthesis of the respective photographed images, with the overlapped areas thereof being blended with a predetermined width and a predetermined ratio.

Furthermore, the mode of deformation of the object present at the overlapped areas differs between the two-dimensional plane projective transformation and the three-dimensional plane projective transformation. In order to solve this problem, preferably, the predetermined width and/or the predetermined ratio for the overlapped areas are(is) set different between the first bird's-eye view image and the second bird'-eye view image.

As a method of generating the second bird's-eye view image, in the method wherein the first bird's-eye view image is generated from a photographed image and the second bird'-eye view image is generated through a three-dimensional plane projective transformation on the first bird's-eye view image, the second bird's-eye view image may be generated directly from the photographed image. In either case, as the first bird's-eye view image is always generated, it will be advantageous to configure the second bird's-eye view image generation section to generate the second bird's-eye view image by effecting a three-dimensional projective transformation on the first bird's-eye view image.

Further, a vehicle periphery monitoring device according to the present invention comprises an in-vehicle camera module photographing a peripheral area of a vehicle; a first bird's-eye view image generation section generating a first bird's-eye view image through a two-dimensional plane projective transformation based on a photographed image acquired by the in-vehicle camera module; a second bird's-eye view image generation section generating a second bird's-eye view through a three-dimensional plane projective transformation based on the photographed image; a displaying image generation section generating a first displaying image for monitor displaying from the first bird's-eye view image and a second displaying image for monitor displaying having a higher displaying magnification than the first displaying image, from a predetermined area of the second bird's-eye view image corresponding to a predetermined area of the first displaying image; and wherein based on parking assistance information including information relating to parking drive pathway, a parking area and a parked vehicle acquired from a parking assistance module effecting a parking control for setting the parking area and generating the parking drive pathway for guiding the vehicle to the parking area, a timing for displaying the second displaying image is determined and at this timing, the second displaying image is displayed on the monitor. With this configuration too, the above-described effect can be achieved. Moreover, by adding the above-described various features to this configuration, the above-described various effects can be achieved also.

Here, when there is no area of interest, there is no need for displaying both the first displaying image and the second displaying image on the monitor having only a limited displaying space. In particular, the second displaying image, which is also an enlarged image of a particular area in the first displaying image, becomes important when an on-road 3D object is present in the periphery of the self vehicle. Therefore, according to one preferred embodiment of the present invention, based on 3D object detection information received from a 3D object detection section detecting a 3D object in the vehicle periphery, the second displaying image including an area where the 3D object is present is displayed on the monitor.

BRIEF DESCRIPTION OF THE DRAWINGS

FIG. 2 is a diagram illustrating a process for displaying a whole-periphery first bird's-eye view image obtained from photographed images by multiple cameras through a two-dimensional plane projective transformation and a synthesis process and a whole-periphery second bird's-eye view image obtained from this first bird's-eye view image through a three-dimensional plane projective transformation.

MODES OF EMBODYING THE INVENTION

Figure 1:
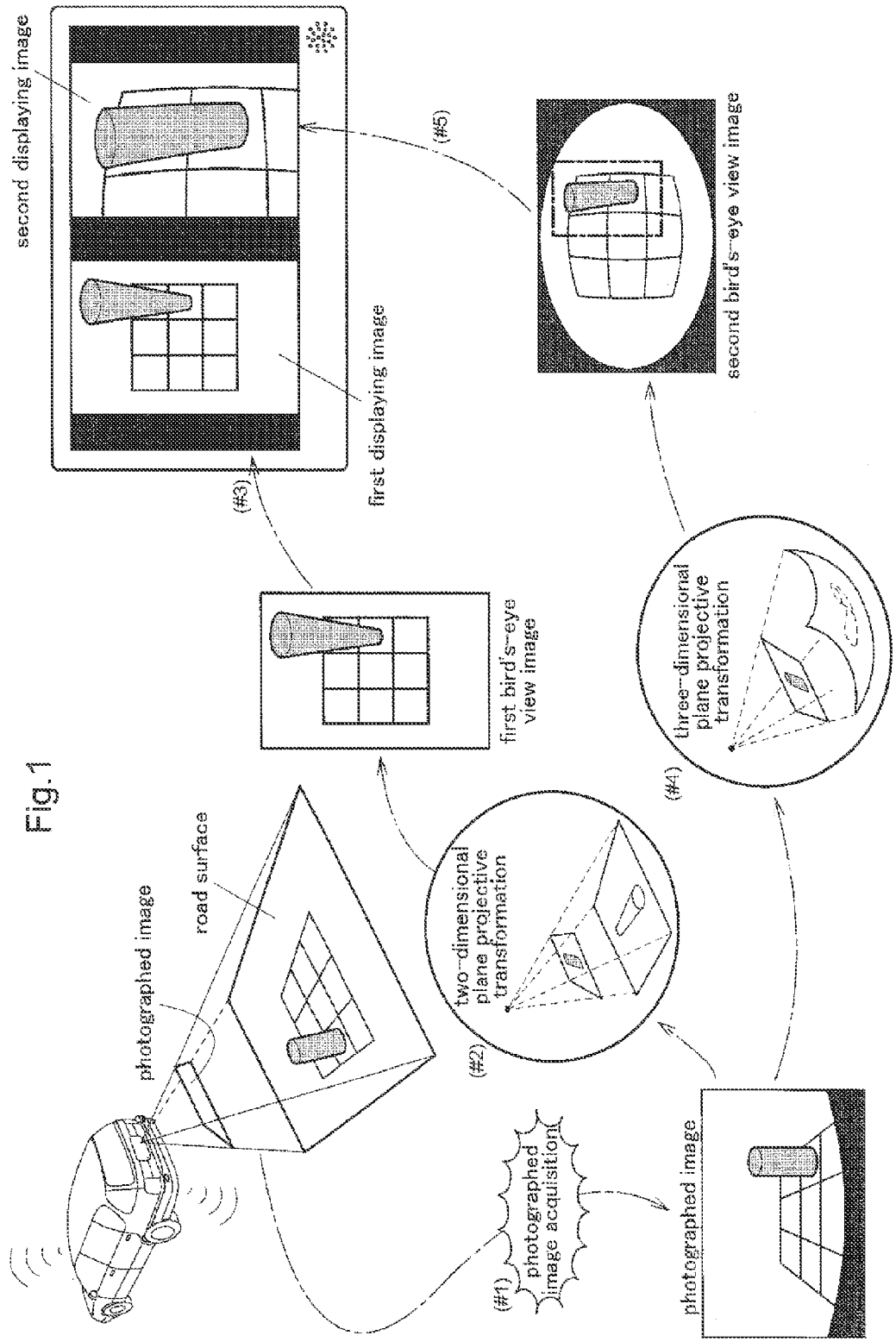
FIG. 1 is a diagram illustrating a process for use in a driving assistance device according to the present invention for displaying a first bird's-eye view image obtained by effecting a two-dimensional plane projective transformation on a photographed image as a starting image and a second bird's-eye view image obtained by effecting a three-dimensional plane projective transformation on a photographed image as a starting image.

Firstly, with reference to FIG. 1, there will be explained a basic process for use in a driving assistance device according to the present invention for displaying a first bird's-eye view image obtained through a two-dimensional plane projective transformation from a photographed image as a starting image and a second bird's-eye view image obtained through a three-dimensional plane projective transformation from a photographed image as a starting image. Here, an in-vehicle camera is a rear camera and a photographed image is an image photographing periphery rearwardly of a vehicle. That is, FIG. 1 shows generation of a bird's-eye view image with using only a photographed image of the rear camera.

For monitor-displaying a bird's-eye view image as a vehicle periphery monitoring screen, firstly, a photographed image of a peripheral area rearwardly of the self vehicle is acquired by the rear camera (#1). From this photographed image, there is effected a first projective transformation (a two-dimensional plane projective transformation) with using a plane parallel with the road surface as a projection plane, that is, a viewpoint conversion with a virtual viewpoint set immediately upwards (#2). Through this two-dimensional plane projective transformation process, there is obtained a first bird's-eye view image which is a bird's-eye view image as viewed from immediately upwardly of the area rearwardly of the vehicle. This first bird's-eye view image, after being subject to a trimming process for shaping, is displayed as a first displaying image on a monitor screen (#3).

Further, from the photographed image, there is effected a second projective transformation (a three-dimensional plane projective transformation) with setting a three-dimensional plane on the road surface as a projection plane, that is, a projective transformation involving not only a viewpoint conversion with setting a virtual viewpoint immediate upwards, but also setting a projection plane as a curved plane or a bent plane (#4). Here, it is assumed that a dome-shaped concave plane is employed as a three-dimensional plane. Through this three-dimensional plane projective transformation, there is obtained a second bird's-eye view image which is a bird's-eye view image projected from immediately above the vehicle rear area onto the curved plane disposed on the road surface. As this second bird's-eye view image is a projection plane onto a three-dimensional plane such as a bent plane or a curved plane, the image will suffer a certain amount of deformation. However, such deformation will be partially offset by deformation through the viewpoint conversion by the upper virtual viewpoint. For this reasons, the second bird's-eye view image provides an advantage of facilitating grasping of a distance between the self vehicle and an on-road 3D object, as e.g. the deformation due to the viewpoint conversion of upward elongation of the on-road 3D object is restricted.

From this second bird's-eye view image, a designated image area is cutout and this cutout image area is enlarged to be shown as a second displaying image in juxtaposition with the first displaying image on the monitor (#05). Incidentally, at the area where the second displaying image is displayed, prior to displaying of the second displaying image, an image photographed by a rear camera 1a is shown, for instance.

Displaying timing of the second displaying image and the cutout area from the second bird's-eye view image may be selected by a user. However, in case the vehicle is provided with a 3D object detection function, at the time of detection of a 3D object, an image area showing this detected 3D object may be cut out and displayed as the second displaying image on the monitor screen. Otherwise, a photographed image by the rear camera can be displayed as it is as a normal image within a displaying frame for the second displaying image.

In the illustrated explanation based on FIG. 1, with using only a photographed image from the rear camera, there are obtained the first bird's-eye view image through the second-dimensional projective transformation (road surface projective transformation) and the second bird's-eye view image through the three-dimensional plane projective transformation (concave projective transformation). Further, from the respective bird's-eye view images, the first displaying image and the second displaying image are generated. However, the best mode of periphery monitoring will be showing a driver a whole-periphery bird's-eye view image that allows grasping of periphery situation of four sides centering about the self vehicle, in particular, a whole-periphery bird's-eye view image that allows grasping of the road surface situation. Next, there will be explained a flow of basic image processing for periphery monitoring using a whole-periphery bird's-eye view image.

Figure 3:
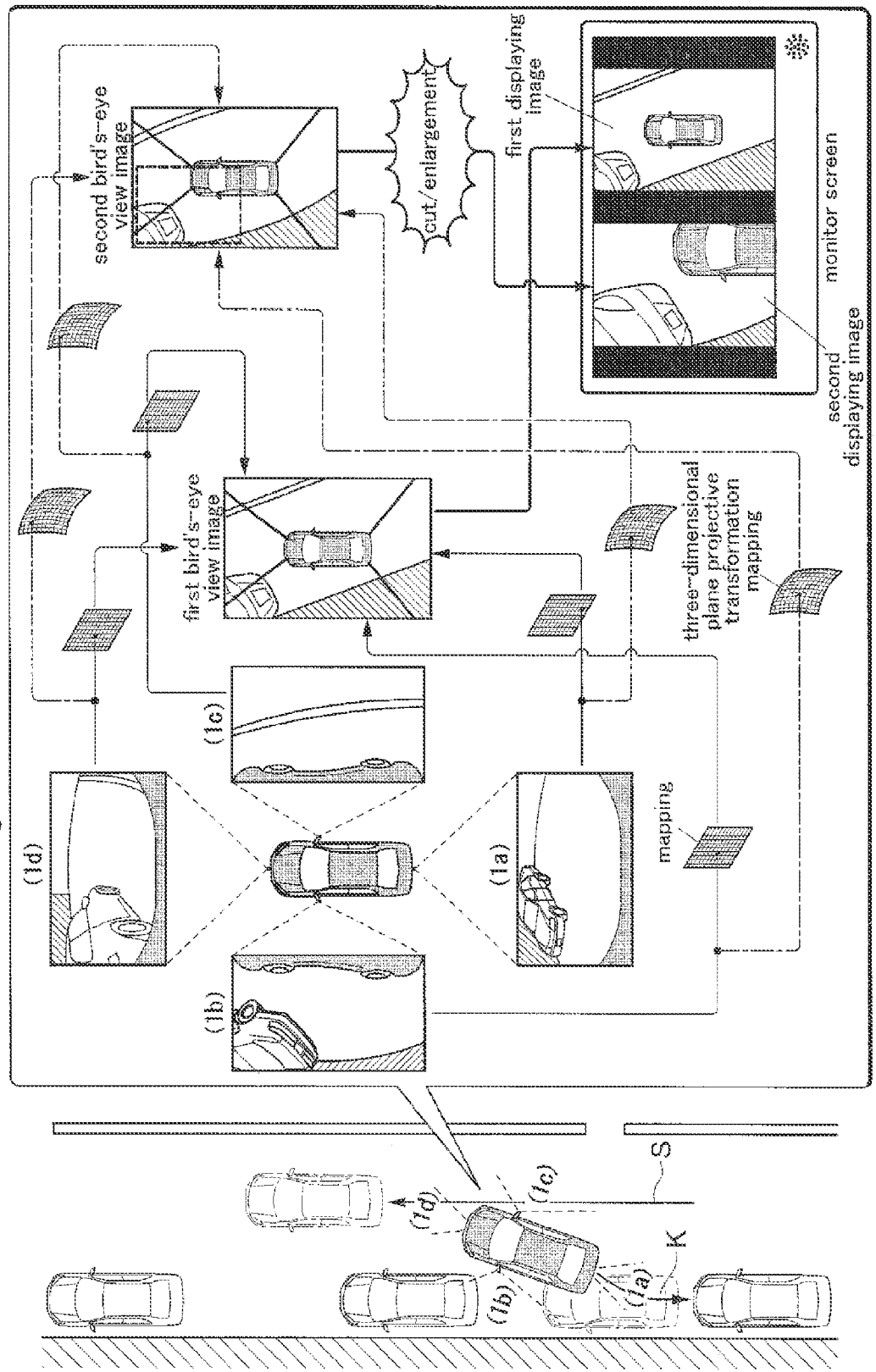
FIG. 3 is a diagram illustrating a process for displaying a whole-periphery first bird's-eye view image obtained from photographed images by multiple cameras through a two-dimensional plane projective transformation and a synthesis process and a whole-periphery second bird's-eye view image obtained from the photographed images through a three-dimensional plane projective transformation and a synthesis process.

FIG. 2 is a diagram illustrating a process for displaying a whole-periphery first bird's-eye view image obtained from photographed images by multiple cameras through a two-dimensional plane projective transformation and a synthesis process and a whole-periphery second bird's-eye view image obtained from this first bird's-eye view image through a three-dimensional plane projective transformation. FIG. 3 is a diagram illustrating a process for displaying a whole-periphery first bird's-eye view image obtained from photographed images by multiple cameras through a two-dimensional plane projective transformation and a synthesis process and a whole-periphery second bird's-eye view image obtained from the photographed images through a three-dimensional plane projective transformation and a synthesis process. In FIG. 2 and FIG. 3, as in-vehicle camera modules, there are provided the rear camera 1a, a left side camera 1b, a right side camera 1c, and a front camera 1d. And, for parking drive assistance through a parallel parking by reverse driving, there employed a device for generating two kinds of bird's-eye view images from four periphery photographed images from these cameras.

In an image processing procedure illustrated in FIG. 2, firstly, a rear photographed image acquired by the rear camera 1a is subject to a projective transformation from immediately above the vehicle as a rear area image of a whole-periphery bird's-eye view image through a normal two-dimensional plane projective transformation. Similarly, a left photographed image by the left side camera 1b, a right photographed image by the right side camera 1c and a photographed image by the front camera 1d are subject to projective transformation as a left area image, a right area image and a front area image of the whole-periphery bird's-eye view image, respectively. Here, the projective transformation is effected through mapping using a mapping table for a two-dimensional plane projective transformation. A first bird's-eye view image is generated through image synthesis with forming an overlapped area of photographed images where bird's-eye view images generated from respective photographed images (one segment of the final first bird's-eye view image) are disposed adjacent each other. In this image synthesis, there is effected a blend synthesis process (an α blend) with a predetermined ratio at an overlapped area having a predetermined width.

The generated first bird's-eye view image is subject, when needed, to a trimming process, and then monitor-displayed as a first displaying image. The generated first bird's-eye view image is further subject to a three-dimensional plane projective transformation, e.g. a projective transformation to a concave projection plane, by mapping using a three-dimensional plane projective transformation mapping table. Through this mapping, a second bird's-eye view image is generated. This second bird's-eye view image suffers deformation by being projected to the three-dimensional plane. However, this deformation can also offset rising elongation deformation of an on-road 3D object which occurred in the first bird's-eye view image. The generated second bird's-eye view image is then cut out and enlarged at its designated image area, e.g. an image area corresponding to a location of interest for the driver in a parallel parking by reverse driving and displayed on the monitor as a second displaying image in adjacent juxtaposition with the first displaying image. In the example illustrated in FIG. 2, an area adjacent a left front portion of the self vehicle in the course of parallel parking and a right rear portion of a parked other vehicle is considered as a location of interest for the driver and is being shown as the second displaying image.

An example of suitable timing of displaying this second displaying image will be explained with reference also to FIG. 2. FIG. 2 schematically illustrates a parallel parking. Yet, in case a parking assistance device is in operation for instance, firstly, a search driving for searching a parking area to be parked (a traveling pathway indicated by mark S in the figure) is effected. Upon detection of a parking area as an space un-preoccupied by any parked vehicle during this search driving, the vehicle will be advanced to a parking start point (start point of reverse driving) for parking at this parking area. At the time of detection of a parking area, there has been obtained information about a parked vehicle (3D object) delimiting this parking area (this includes also information of no parked vehicle being present). In the parking assistance process, a parking drive pathway from the parking start point to the parking area (the drive pathway indicated by a mark K in the figure) is calculated and a parking assistance along this parking drive pathway is effected. Incidentally, in this parking assistance, an automatic steering control along the parking drive pathway may be effected, with the driver effecting only speed adjustment. At the time of reversing along this parking drive pathway, there has already been obtained the information about a parked vehicle (3D object). Therefore, the second displaying image based on the photographed images showing this parked vehicle is displayed on the monitor screen at a timing when the left front side of the self vehicle approaches and almost comes into contact with the vehicle parked forwardly.

In an image processing procedure illustrated in FIG. 3 also, firstly, a rear photographed image by the rear camera 1a is subject to a projective transformation as a rear area image of a whole-periphery bird's-eye view image, through a normal two-dimensional plane projective transformation from immediately upwardly of the vehicle. Similarly, a left photographed image by the left side camera 1b, a right photographed image by the right side camera 1c and a photographed image by the front camera 1d are subject to projective transformation as a left area image, a right area image and a front area image of the whole-periphery bird's-eye view image, respectively. A first bird's-eye view image is generated through image synthesis with forming an overlapped area of photographed images where bird's-eye view images generated from respective photographed images (one segment of the final first bird's-eye view image) are disposed adjacent each other. In this image synthesis, there is effected a blend synthesis process (an α blend) with a predetermined ratio at an overlapped area having a predetermined width suitable for the whole-periphery bird's-eye view image by the two-dimensional plane projective transformation. The generated first bird's-eye view image is subject, when needed, to a trimming process, and then monitor-displayed as a first displaying image.

In an image processing procedure shown in FIG. 3, the second bird's-eye view image is generated by synthesizing bird's-eye view image segments which were subjected to the three-dimensional plane projective transformation for photographed images from the respective cameras. More particularly, a rear photographed image by the rear camera 1a is subjected to a three-dimensional plane projective transformation which is a projective transformation to a three-dimensional projection plane disposed on the road surface from immediately upward of the vehicle to be generates as a rear area image for the final whole-periphery bird's-eye view image. Similarly, a left photographed image by the left side camera 1b, a right photographed image by the right side camera 1c and a photographed image by the front camera 1d are subject to projective transformation as a left area image, a right area image and a front area image of the whole-periphery bird's-eye view image, respectively. A second bird's-eye view image is generated through image synthesis with forming an overlapped area of photographed images where bird's-eye view images generated from respective photographed images (one segment of the final second bird's-eye view image) are disposed adjacent each other. In this image synthesis too, an overlapping area having predetermined width suitable for the whole-periphery bird's-eye view image by the three-dimensional plane projective transformation, and there is effected a blend synthesis process (an α blend) with a predetermined ratio similarly suitable for the whole-periphery bird's-eye view image by the three-dimensional plane projective transformation. The first bird's-eye view image and the second bird's-eye view image differ from each other in deformation (distortion) of the image in the peripheral portion. Therefore, mutually different overlapping area widths and blend ratios are set. The generated second bird's-eye view image is then cut out and enlarged at its designated image area and displayed on the monitor as a second displaying image in adjacent juxtaposition with the first displaying image.

Next, a configuration of a specific embodiment of the vehicle periphery monitoring device according to the present invention will be explained with reference to the drawings. In this embodiment, it is assumed that the embodiment employs the image processing procedure illustrated in FIG. 3. Therefore, a vehicle periphery monitoring device incorporating an image processing system for generating the first displaying image and the second displaying image from photographed images from the four in-vehicle cameras, i.e. the rear camera 1a, the front camera 1d, the left side camera 1b and the right side camera 1c, is mounted in a vehicle. In the following discussion, these in-vehicle cameras 1a, 1b, 1c, 1d may sometimes be referred to generically as the camera 1, for the sake of convenience.

The camera 1 is a digital camera configured to photograph over time 30 frames per second of two-dimensional images with using imaging devices, such as CCD (charge coupled device) or CIS (CMOS image sensor) and effect digital conversion of these images and output them in real time. The camera 1 is comprised of a wide-angle lens. In particular, in the instant embodiment, there is secured a viewing angle from 140 to 190 degrees in the horizontal direction and the camera 1 is mounted in the vehicle with an optical axis having about 30 degrees depression angle.

Figure 4:
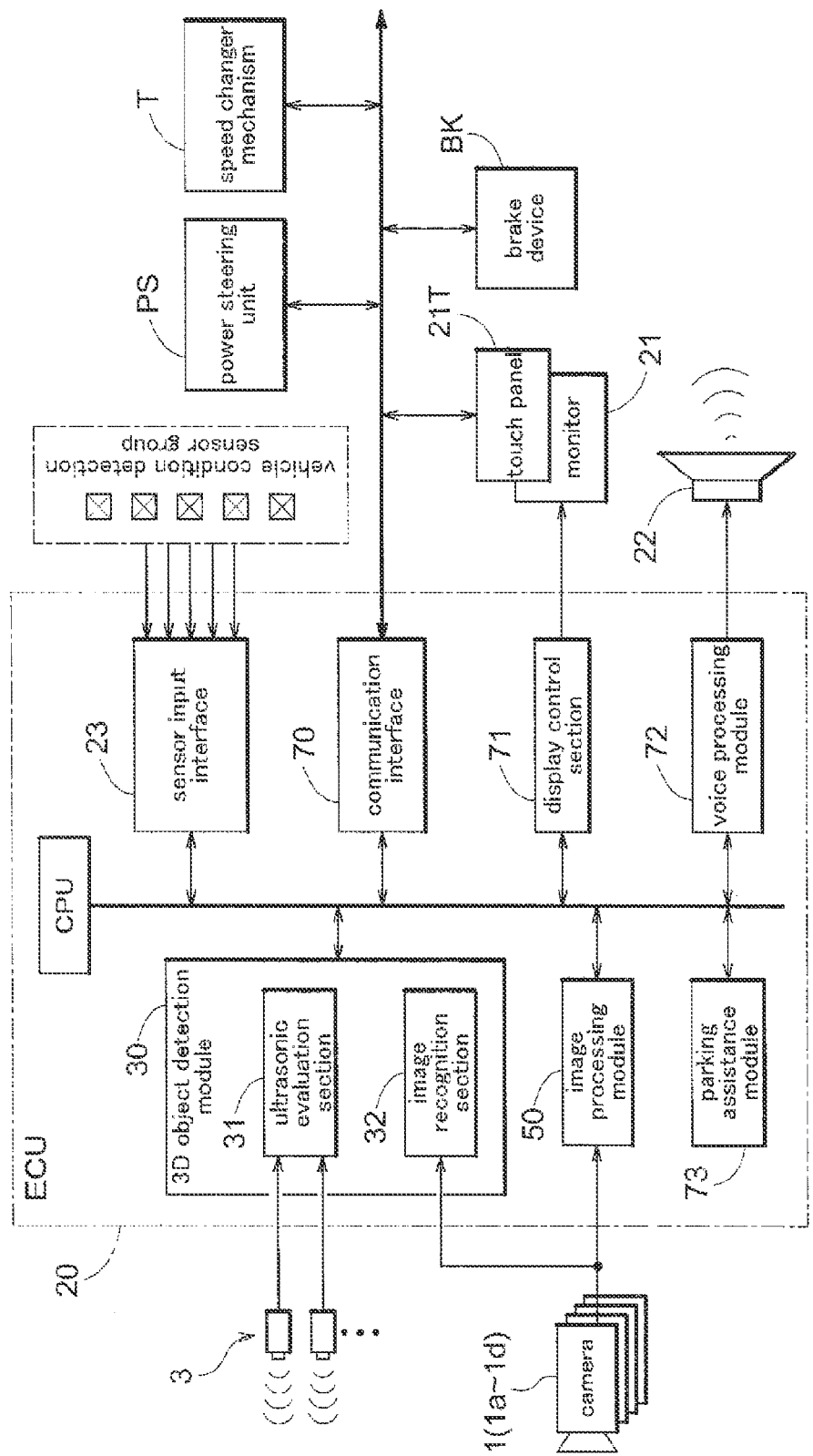
FIG. 4 is a functional block diagram for explaining functions of an electronic control system including a control unit of the driving assistance device.

Inside the vehicle, there is mounted a control unit (simply "ECU" hereinafter) 20 which constitutes the core of the vehicle periphery monitoring device. This ECU 20, as shown in FIG. 4, includes a sensor input interface 23 for transmitting signal inputs from a group of vehicle condition detection sensors as they are or with evaluations thereof to the inside of the ECU 20, a communication interface 70, etc. as well as a microprocessor for processing input information, a DSP (digital signal processor), etc.

The group of vehicle condition detection sensors connected to the sensor input interface 23 detect various conditions relating to driving operation and traveling of the vehicle. Though not shown, the vehicle condition detection sensor group includes a steering sensor for determining direction (steering direction) and operation amount (steering amount), a shift position sensor for determining the shift position of a shift lever, an accelerator sensor for determining an operation amount of an accelerator pedal, a brake sensor for detecting an operation amount of a brake pedal, a distance sensor for detecting a traveling distance of the self vehicle, etc.

Further, the communication interface 70 used as an input/output interface employs an in-vehicle LAN as a data transmission network and to this interface 70, there are connected control units for a monitor 21, a touch panel 21T, a power steering unit PS, a speed changer mechanism T, a brake device BK, etc. to be capable of transmitting data thereto. In addition, as an output device for voice information, there is provided a speaker 22.

Further, the ECU 20 includes various functional units/sections which are realized in the form of hardware and/or software. As such functional units relating in particular to the present invention, there can be cited a 3D (three-dimensional) object recognition module 30 as a 3D object detection section of the invention, an image processing module 50, a display control section 71, and a voice processing module 72. A monitor displaying image generated by the image processing module 50 is converted into video signals by the display control section 71 and transmitted as such to the monitor 21. A voice guide or an alarm sound for emergency generated by the voice processing module 72 will be outputted via the speaker 22.

The parking assistance module 73 has functions for assisting parking of a self vehicle at a predetermined parking area, including a parking area setting function, a parking drive pathway generation function, a position calculation function, a parking guidance function, etc. The parking area setting function is a function for setting a parking area where the self vehicle is to be parked, through an automatic setting through an image processing based on a photographed image, a heuristic processing based on 3D object information from the 3D object detection module 30, or setting by a manual operation or any combination of these. The parking drive pathway generation function is a function calculating a parking drive pathway from a parking start point to a parking area. The position calculation function is a function of detecting position information of self vehicle which varies in association with a movement of the self vehicle and a relative position relationship relative to the parking area which varies in association with the movement of the self vehicle. The self vehicle position at the time of actual parking driving can be obtained, based on e.g. a vehicle movement amount acquired by the distance sensor and an operation amount of the steering wheel determined by the steering sensor. The parking assistance function is a function of guiding a self vehicle along a parking drive pathway with reference to an obtained self vehicle position. The parking guidance function may automatically control the steering wheel along the parking drive pathway or may be instructing to the driver a steering direction, a steering amount of the steering wheel along the parking drive pathway via a display screen or a voice.

The 3D object detection module 30 includes an ultrasonic wave evaluation section 31 for evaluating detection signals form multiple ultrasonic sensors 3 for 3D object detection, and an image recognition section 32 for effecting 3D object detection with using photographed images from the cameras 1. The ultrasonic sensors 3 are disposed at opposed ends and a center position of a front portion, a rear portion, a left side portion and a right side portion of the vehicle respectively and are capable of detecting an object (3D object) present nearby the vehicle periphery through reflected waves therefrom. Each ultrasonic sensor 3 is capable not only of estimating the distance from the vehicle to the object or the size of the object through processing a return time and amplitude of the reflected wave of each ultrasonic sensor 3, but capable also of estimating a movement of the object or an outer shape thereof in the lateral direction through processing detection results of all the ultrasonic sensors 3 over time. The image recognition section 32 incorporates an object recognition algorithm which per se is known and detects a 3D object present in the vehicle periphery from inputted photographed images, in particular, photographed images that change over time. For detection of a 3D object, only one of the ultrasonic wave evaluation section 31 and the image recognition section 32 can be used. However, through cooperative operation of the image recognition section 32 effective for detection of the shape of a 3D object and the ultrasonic wave evaluation section 31 effective for detection of the distance to a 3D object, that is, the position of the 3D object, more accurate 3D object recognition is made possible. With this, the 3D object detection module 30 can output 3D object information describing the position, directional posture, size, color tone of the detected 3D object. Therefore, either one of the ultrasonic wave evaluation section 31 and the image recognition section 32 or both of these in combination function as the 3D object detection section in the present invention and the 3D object detection section further includes a different 3D object detection device using laser radar or the like may be employed.

Figure 5:
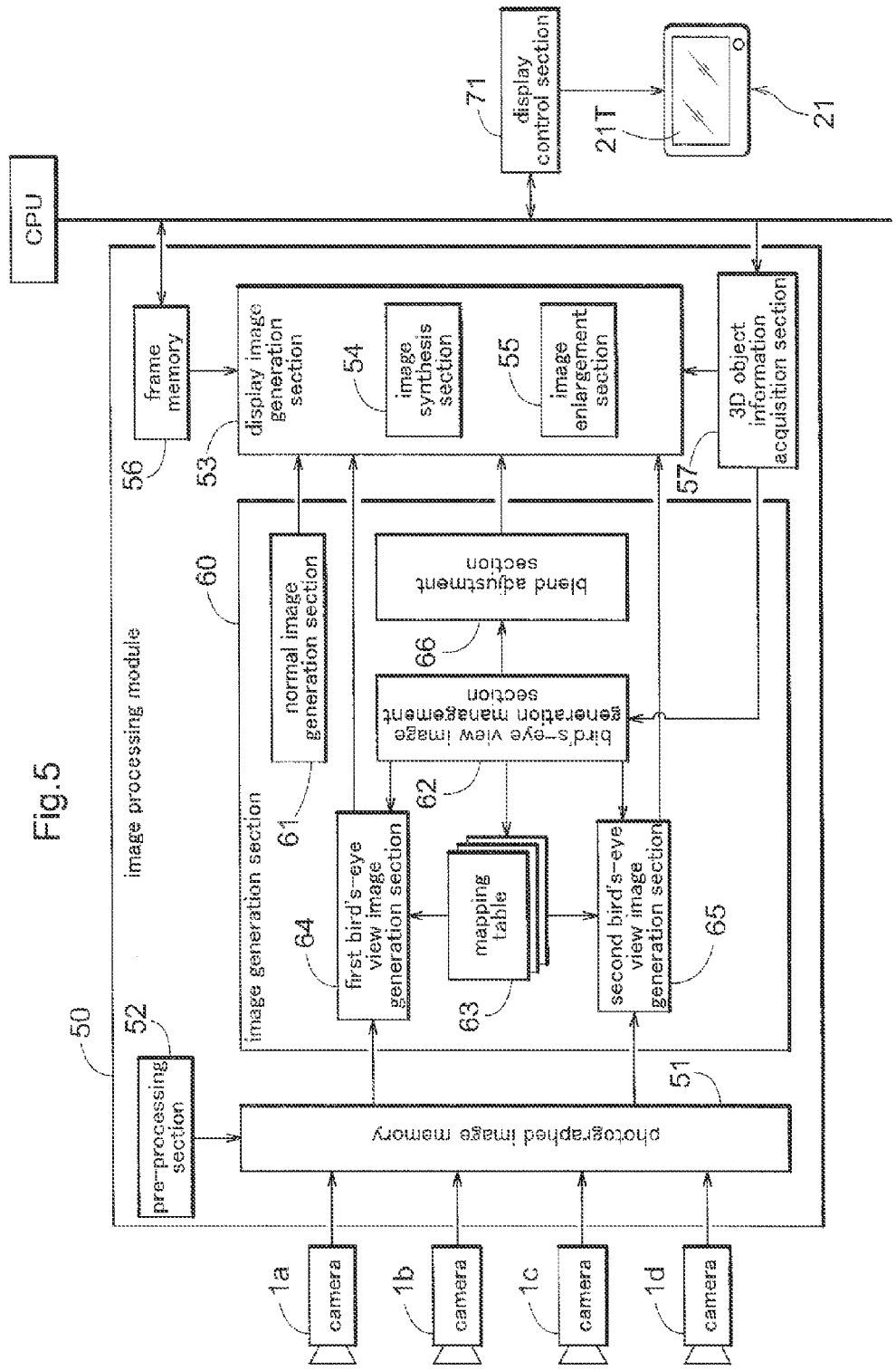
FIG. 5 is a functional block diagram of an image processing module.

FIG. 5 shows a functional block diagram of the image processing module 50 included in the ECU 20. This image processing module 50 is configured to generate an image such as a bird's-eye view image transformed by a projection transformation from a photographed image obtained by the camera 1 photographing the vehicle periphery.

The image processing module 50 includes a photographed image memory 51, a pre-processing section 52, an image generation section 60, a displaying image generation section 53, a frame memory 56, and a 3D object information acquisition section 57. In operation, photographed images obtained by the cameras 1 are mapped in the photographed image memory 51 and the pre-processing section 52 adjusts brightness balance, the color balance, etc. among the photographed images obtained individually by the cameras 1. The 3D object information acquisition section 57 receives the 3D object information outputted from the 3D object detection module 30 and reads out various kinds of information such as the position, directional posture, size, color tone, or the like of the 3D object described in this 3D object information. Further, this 3D object information acquisition section 57 is configured to receive, as additional 3D object information from the parking assistance module 73, parking assistance information including a position of a parked vehicle (3D object) and a positional relationship between the position of the parked vehicle (3D object) and the position of the self vehicle obtained when a parking area was set.

The image generation section 60 includes a normal image generation section 61, a bird's-eye view image generation management section 62, a mapping table 63, a first bird's-eye view image generation section 64, a second bird's-eye view image generation section 65, and a blend adjustment section 66. The normal image generation section 61 adjusts a photographed image to an image suitable to be monitor-displayed directly as a vehicle periphery image. The vehicle periphery image to be monitor-displayed can be an image selected by the driver from the photographed images obtained by the rear camera 1*a*, the left and right side cameras 1*b*, 1*c*, the front camera 1*d* or a desired combination of a plurality of photographed images.

The first bird's-eye view image generation section 64 effects the above-described two-dimensional plane projective transformation with using a photographed image mapped in the photographed image memory 51, thereby to generate the first bird's-eye view image. As this two-dimensional plane projective transformation, there is set, as a default setting, a projective transformation with using a point upwardly of the vehicle as a virtual viewpoint and a plane in agreement with the road surface as a projection plane. Instead, this setting may be changed according to a driver's preference or a driving condition.

The second bird's-eye view image generation section 65 effects the above-described three-dimensional plane projective transformation with using a photographed image mapped in the photographed image memory 51, thereby to generate the second bird's-eye view image. As this three-dimensional plane projective transformation, there is set a projective transformation with using a dome-shaped concave plane disposed on the road surface and a virtual viewpoint upwardly of the vehicle as a default setting. Instead, the projection plane used in this three-dimensional plane projective transformation can be selected from other three-dimensional planes, e.g. a semi-spherical plane, a cylindrical plane, a bent flat plane, etc. Further, it is also possible to displace the center of this projection plane and the center of projection by a predetermined offset amount.

Incidentally, in the instant embodiment, the projective transformations at the first bird's-eye view image generation section 64 and the second bird'-eye view image generation section 65 are effected through map transformation using a mapping table. Therefore, there are stored in advance various mapping tables for use in these projective transformations to be selectable therefrom. Hence, a group of mapping tables consisting of the multiple mapping tables selectively stored or individual such mapping tables are referred to as the mapping table 63. Each mapping table (to be referred to simply as "a map" hereinafter) constituting the mapping table 63 can be constructed in various forms. Here, it is configured as a map describing correlation between pixel data of a photographed image and a pixel data of a projective transformed image (bird's-eye view image), with each pixel of one frame of photographed image describing a destination pixel for a bird's-eye view image.

Figure 6:
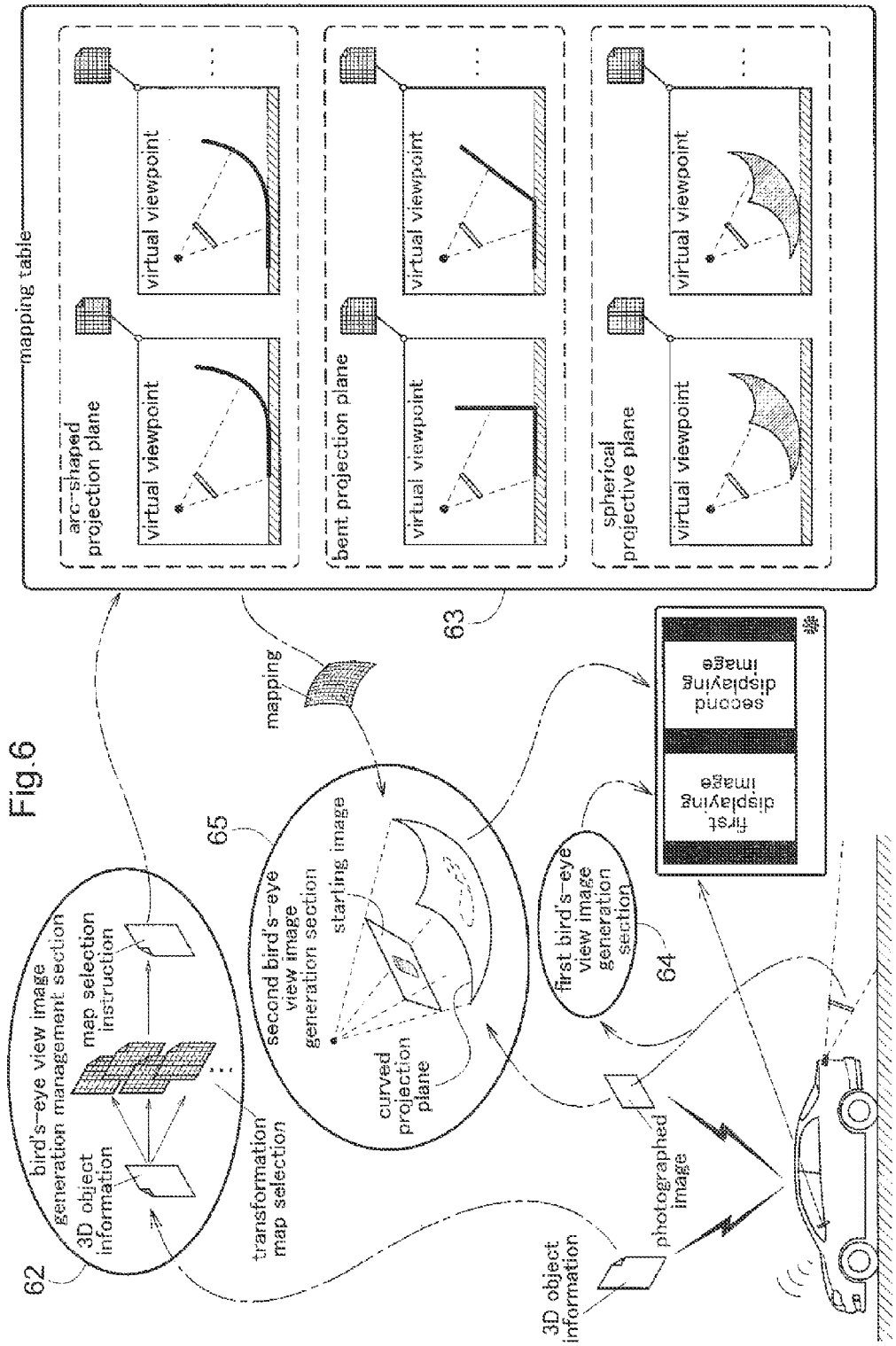
FIG. 6 is a diagram illustrating a process for generating a second bird's-eye view image with using a projective transformation map selected from various projective transformation maps.

The first bird's-eye view image generation section 64 generates a normal bird's-eye view image, so maps to be selected from the mapping table 63 are limited. On the other hand, the three-dimensional plane projective transformation used in the second bird's-eye view image generation section 65 varies in many kinds, maps for many kinds of three-dimensional plane projective transformation can be registered at the mapping table 63, from which a suitable one may be selected. Furthermore, the selection of a three-dimensional plane projective transformation map to be used can be determined based on properties such as the position of presence and a size of a 3D object, etc. A process of such selection of a three-dimensional plane projective transformation map based on 3D object information is schematically illustrated in FIG. 6. Selection of the type of projective transformation to be used at the first bird's-eye view image generation section 64 and the second bird's-eye view image generation section 65, that is, selection of a map to be used from the mapping table 63 is effected by the bird's-eye view image generation management section 62.

Regarding the selection of a projective transformation to be used at the second bird's-eye view image generation section 65, more detailed explanation will be given with reference to FIG. 6.

Based on the 3D object data (position, directional posture, shape, etc.) of the 3D object described in the 3D object information outputted from the 3D object detection module 30 or the parking assistance information outputted from the parking assistance module 73, a process of displaying a second displaying image based on a photographed image showing this 3D object in juxtaposition with the first displaying image which is a bird's-eye view image generated by the first bird's-eye view image generation section 64 is initiated. Firstly, based on 3D object characteristics data read from the 3D object information as input parameters, a rule calculation process is effected to determine a map selection instruction for instructing the best type of projective transformation. Based on this map selection instruction, a suited map is selected from the mapping table 63 and set at the second bird's-eye view image generation section 65. For instance, based on the 3D object characteristics data, there are set transformation parameters representing a projection plane shape for regulating the projective transformation and a relative position between this projection plane and the 3D object (more particularly, a 3D object image as a projection transformation source image).

Here, as a projective transformation for reducing distortion of the 3D object, as schematically shown in FIG. 5, there are prepared a plurality of projective transformations differing in the projective plane shapes and the relative position to the 3D object in the form of maps. Some no-limiting examples of projective plane shapes are cylindrical curved shape, a bent plane comprised of a flat plane bent in the middle, a spherical curved plane, etc. Needless to say, a perpendicular plane perpendicular to the road surface or an inclined plane rising from the road surface can also be utilized as the projective plane. Further, by disposing respective projective planes at different relative positions relative to the 3D object, different projective transformations can be realized. A particularly preferred arrangement is that a 3D object is projected in an inclined plane area or curved area rising from the road surface. This arrangement restricts elongation distortion in the whole projection image of the 3D object that occurs in the projection plane parallel with the road surface. For this reasons, an arrangement of a projection position of a road surface side end of the 3D object being in agreement with the area position in the projection plane rising from the road surface is advantageous. In this, since the position of the road-surface side end of the 3D object can be detected by an edge detection process, a bird's-eye view image of the 3D object should be generated with using a projection plane disposed such that this position is placed in agreement with the rising position of the projection plane rising from the road surface.

The displaying image generation section 53 includes an image synthesis section 54 for synthezing images generated by the image generation section 60 and an image enlargement section 55 trimming and enlarging an image. The image synthesis section 54 effects panorama synthesis of bird's-eye view image segments generated for photographed images of the respective cameras and generates a first bird's-eye view image and a second bird's-eye view image of the whole periphery. During this panorama synthesis, in order to effect the above-described blend synthesis process, there are employed an optimal overlapping area width and an optimal blend ratio for the projective transformation to be used determined by the blend adjustment section 66. The image enlargement section 55 trims and enlarges an image area in the second bird's-eye view image showing the 3D object in order to generate the second displaying image from the second bird's-eye view image.

The final first displaying image and second displaying image are fitted within predetermined template frames and forwarded to the frame memory 56 as monitor displaying images and then displayed on the monitor 21 via the display control section 71.

Figure 7:
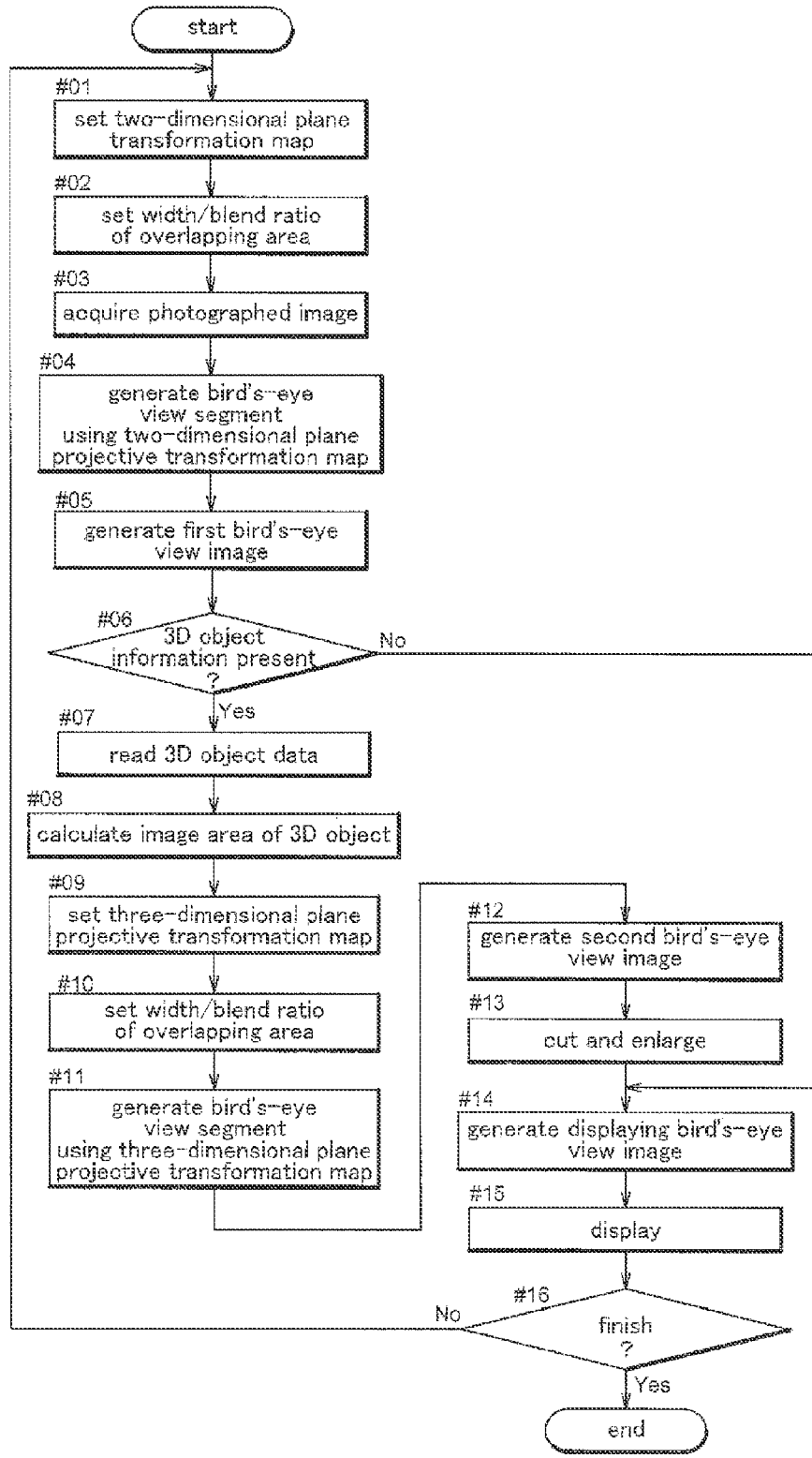
FIG. 7 is a flowchart illustrating a bird's-eye view image displaying routine.

Next, there will be explained a process of a bird's-eye view image display by the vehicle periphery monitoring device incorporating the image generation device configured as above, with reference to the flowchart of FIG. 7.

Upon starting of a bird's-eye view image display routine for the sake of vehicle periphery monitoring, firstly, the process sets a map for a projective transformation for a two-dimensional plane projective transformation for use at the first bird's-eye view image generation section 64, in this case, a map for a projective transformation using a road surface as the projection plane (#01). Further, the process sets also a width and a blend ratio of overlapped areas at the time of synthesis of the bird'-eye view image segments (#02). Next, the process obtains a photographed image of each in-vehicle camera 1 (#03) and generates a bird's-eye view image segment from each photographed image using the set map (#04). These generated bird's-eye view image segments are combined and synthesized with the set width and blend ratio of the overlapped areas, thus generating a first bird's-eye view image which is a normal bird's-eye view image (#05). In doing this, a bird's-eye view image of a vehicle (this can be a graphic illustration or symbol) present at a self vehicle position is disposed.

The process checks whether 3D object information is being outputted from the 3D object detection module 30 or the parking assistance module 73 or not (#06). When no 3D object information is being outputted (NO branching at step #06), it is determined that no photographed image records an object of interest, then, the first bird's-eye view image generated at step #05 is combined with a normal image (e.g. a rear monitoring image) to generate a displaying bird's-eye view image (#14). The generated displaying bird's-eye view image is displayed on the monitor 21 (#15). Here, if no ending instruction for the the bird'-eye view image displaying routine exists (NO branching at step #16), the process returns to step #01 and repeats this routine.

If it is found at the checking at step #06 that 3D object information is being outputted (YES branching at step #06), it is determined that a 3D object of interest is recorded in the photographed image. Then, firstly, from the 3D object information, the process reads out such data as the position, directional posture, size of the detected 3D object, etc. (#07). Based on the read data relating to the 3D object, the process calculates an image area for this 3D object in the photographed image (#08). Further, in the instant embodiment, based on the data relating to the 3D object, a map for the three-dimensional plane projective transformation for use at the first bird's-eye view image generation section 64, in this case, a map for a projective transformation using a semi-spherical plane as the projection plane is set (#09). Similarly, based on the data relating to the 3D object, the width and the blend ratio of the overlapped areas at the time of synthesis of the bird's-eye view image segments, etc. are set (#10). Using this set map for the three-dimensional plane projective transformation, bird's-eye view image segments are generated from the photographed images (#11). The generated bird's-eye view image segments are combined and synthesized with the set overlapping area width and blend ratio, thereby to generate the second bird's-eye view image which is a spherical plane projected bird's-eye view image (#12). The generated second bird'-eye view image is trimmed by an area containing the 3D object based on the calculated image area of the 3D objet and enlarged (#13). This enlarged partial area of the second bird's-eye view image becomes the second bird's-eye view image for displaying. Accordingly, at the time of generation of the second bird's-eye view image at step #12, only a photographed image(s) including this 3D object may be employed. The second bird's-eye view image as a partially enlarged bird's-eye view image generated as above and the first bird's-eye view image are combined together to generate displaying bird's-eye view images (#14). The generated bird's-eye view images are displayed on the monitor 21 (#15). Incidentally, based on existence of a 3D object nearby the vehicle, the second displaying image is generated based on the second bird's-eye view image and this second displaying image is displayed together with the first displaying image on the monitor 21. As this monitor displaying screen, reference can be made to the monitor displaying screen shown in FIG. 2 and FIG. 3.

[Other Embodiments]

(1) In the specific embodiment described above, the image processing technique illustrated in FIG. 3 was employed. Instead, it is also possible to employ the image processing technique illustrated in FIG. 3 with substantially identical configuration or to employ the image processing technique illustrated in FIG. 1, that is, the image processing technique to generate two kinds of bird's-eye view images by a single camera.

(2) In the above-described embodiment, for easy-to-understand explanation of the functions of the image processing module 50, as shown in FIG. 5, the module configuration was divided into blocks of respective functions. However, it is understood that these functional blocks are provided for the sake of explanation, the present invention is not limited to these divided functional blocks. For instance, some of the respective functional sections may be combined together, or conversely one functional section can be further divided. Moreover, regarding the image processing module 50 per se, all its functions or some of its functions can be incorporated in other ECU.

(3) In the above-described embodiment, as 3D object detection methods, there were presented either the 3D object detection using ultrasonic wave or 3D object detection through image recognition as well as the combination thereof. Needless to say, it is also within the scope of the present invention to employ any other 3D object detection technique such as a laser radar technique, an infrared technique.

(4) In the above-described embodiment, the second displaying image is displayed in juxtaposition with the first displaying image on the monitor screen. Instead, for example, to display the second displaying image in place of the first displaying image, the first displaying image and the second displaying image may be displayed selectively.

INDUSTRIAL APPLICABILITY

The present invention may be applied to any system that effects vehicle periphery monitoring with using a bird's-eye view image.

DESCRIPTION OF REFERENCE MARKS

1: camera module
30: 3D object detection module
21: monitor
50: image processing module
53: displaying image generation section
54: image synthesis section
55: image enlargement section
57: 3D object information acquisition section
60: image generation section
61: normal image generation section
62: bird's-eye view image generation management section
63: mapping table
64: first bird's-eye view image generation section
65: second bird's-eye view image generation section
66: blend adjustment section
71: display control section
73: parking assistance module

The invention claimed is:

1. A vehicle periphery monitoring device comprising:
an in-vehicle camera module photographing a peripheral area of a vehicle;
a first bird's-eye view image generation section generating a first bird's-eye view image through a two-dimensional plane projective transformation based on a photographed image acquired by the in-vehicle camera module;
a second bird's-eye view image generation section generating a second bird's-eye view image through a three-dimensional plane projective transformation based on the photographed image, the three-dimensional plane projective transformation generating a virtual viewpoint image from above the vehicle through a projective transformation of the photographed image using a three-dimensional plane as a projection plane;
a displaying image generation section generating a first displaying image for monitor displaying from the first bird's-eye view image and a second displaying image for monitor displaying having a higher displaying magnification than the first displaying image, from a predetermined area of the second bird's-eye view image corresponding to a predetermined area of the first displaying image; and wherein based on 3D object detection information received from a 3D object detection section detecting a 3D object in the vehicle periphery, the second displaying image including an area where the 3D object is present is displayed on the monitor.

2. The vehicle periphery monitoring device according to claim 1, wherein the three-dimensional plane projective transformation employs a concave plane as a projective plane.

3. The vehicle periphery monitoring device according to claim 1, wherein the first displaying image and the second displaying image are displayed on a same monitor screen.

4. The vehicle periphery monitoring device according to claim 1, wherein the second displaying image including a vehicle periphery area designated by a vehicle passenger is displayed on the monitor.

5. The vehicle periphery monitoring device according to claim 1, wherein the in-vehicle camera module comprises multiple in-vehicle cameras having an overlapping area where respective photographing areas thereof are overlapped with each other; the first bird's-eye view image and the second bird's-eye view image are generated by panorama-synthesis of the respective photographed images, with the overlapped areas thereof being blended with a predetermined width and a predetermined ratio.

6. The vehicle periphery monitoring device according to claim 5, wherein the predetermined width and/or the predetermined ratio are(is) set different between the first bird's-eye view image and the second bird'-eye view image.

7. The vehicle periphery monitoring device according to claim 1, wherein the second bird's-eye view image generation section generates the second bird's-eye view image by effecting a curved plane projective transformation on the first bird's-eye view image.

8. The vehicle periphery monitoring device according to claim 1, wherein based on parking assistance information including information relating to parking drive pathway, a parking area and a parked vehicle acquired from a parking assistance module effecting a parking control for setting the parking area and generating the parking drive pathway for guiding the vehicle to the parking area, a timing for displaying the second displaying image is determined and at this timing, the second displaying image is displayed on the monitor.

9. A vehicle periphery monitoring device comprising:
an in-vehicle camera module photographing a peripheral area of a vehicle;
a first bird's-eye view image generation section generating a first bird's-eye view image through a two-dimensional plane projective transformation based on a photographed image acquired by the in-vehicle camera module;
a second bird's-eye view image generation section generating a second bird's-eye view through a three-dimensional plane projective transformation based on the photographed image, the three-dimensional plane projective transformation generating a virtual viewpoint image from above the vehicle through a projective transformation of the photographed image using a three-dimensional plane as a projection plane;
a displaying image generation section generating a first displaying image for monitor displaying from the first bird's-eye view image and a second displaying image for monitor displaying having a higher displaying magnification than the first displaying image, from a predetermined area of the second bird's-eye view image corresponding to a predetermined area of the first displaying image; and
wherein based on parking assistance information including information relating to parking drive pathway, a parking area and a parked vehicle acquired from a parking assistance module effecting a parking control for setting the parking area and generating the parking drive pathway for guiding the vehicle to the parking area, a timing for displaying the second displaying image is determined and at this timing, the second displaying image is displayed on the monitor.

10. The vehicle periphery monitoring device according to claim 9, wherein the three-dimensional plane projective transformation employs a concave plane as a projective plane.

11. The vehicle periphery monitoring device according to claim 9, wherein the first displaying image and the second displaying image are displayed on a same monitor screen.

12. The vehicle periphery monitoring device according to claim 9, wherein based on 3D object detection information received from a 3D object detection section detecting a 3D object in the vehicle periphery, the second displaying image including an area where the 3D object is present is displayed on the monitor.

13. The vehicle periphery monitoring device according to claim 9, wherein the second displaying image including a vehicle periphery area designated by a vehicle passenger is displayed on the monitor.

14. The vehicle periphery monitoring device according to claim 9, wherein the in-vehicle camera module comprises multiple in-vehicle cameras having an overlapping area where respective photographing areas thereof are overlapped with each other; the first bird's-eye view image and the second bird's-eye view image are generated by panorama-synthesis of the respective photographed images, with the overlapped areas thereof being blended with a predetermined width and a predetermined ratio.

15. The vehicle periphery monitoring device according to claim 14, wherein the predetermined width and/or the predetermined ratio are(is) set different between the first bird's-eye view image and the second bird'-eye view image.

16. The vehicle periphery monitoring device according to claim 9, wherein the second bird's-eye view image generation section generates the second bird's-eye view image by effecting a curved plane projective transformation on the first bird's-eye view image.

17. The vehicle periphery monitoring device according to claim 1, wherein the projective transformation is effected through mapping using a mapping table for a three-dimensional plane projective transformation.

18. The vehicle periphery monitoring device according to claim 9, wherein the projective transformation is effected through mapping using a mapping table for a three-dimensional plane projective transformation.

* * * * *